US006904265B1

(12) United States Patent
Valdivia et al.

(10) Patent No.: US 6,904,265 B1
(45) Date of Patent: Jun. 7, 2005

(54) CAPACITY MANAGEMENT IN A BROADBAND SATELLITE COMMUNICATIONS SYSTEM

(75) Inventors: Aaron Valdivia, Ellicott City, MD (US); Rajeev Gopal, N. Potomac, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 613 days.

(21) Appl. No.: 09/832,512

(22) Filed: Apr. 11, 2001

(51) Int. Cl.[7] .............................................. H04B 7/185
(52) U.S. Cl. ...................... 455/12.1; 455/427; 455/428; 455/452.1
(58) Field of Search ................................ 455/12.1, 427, 455/428, 447, 448, 450, 451, 452.1, 452.2, 7, 13.1, 13.2; 370/316, 468

(56) References Cited

U.S. PATENT DOCUMENTS

| | | | |
|---|---|---|---|
| 6,366,761 B1 * | 4/2002 | Montpetit | 455/12.1 |
| 6,381,250 B1 * | 4/2002 | Jacobson et al. | 370/468 |
| 6,498,937 B1 * | 12/2002 | Smith | 455/522 |
| 6,665,518 B1 * | 12/2003 | Courtney et al. | 455/12.1 |
| 2002/0021678 A1 * | 2/2002 | Heatwole et al. | 370/325 |
| 2002/0147011 A1 * | 10/2002 | Kay | 455/427 |

* cited by examiner

Primary Examiner—Nay Maung
Assistant Examiner—Raymond Dean
(74) Attorney, Agent, or Firm—John T. Whelan

(57) ABSTRACT

An approach for managing system capacity of a satellite communications system is disclosed. A satellite communications system provides communication services to a region. A terminal (101, 103) is located within the region and is configured to transmit and receive signals over a satellite (105) having a payload that processes the signals. The terminal (101, 103) has a predetermined profile that includes service class information and rate information. A hub (107) is configured to receive system capacity resource configuration data that reflect capacity requirements of a service provider and to determine partitioning of system capacity over the region based upon the system capacity resource configuration data. The hub (107) transmits configuration information to the payload of the satellite (105) according to the determined partitions. The terminal (101, 103) is configured to transmit a bandwidth request message to the payload. The payload selectively allocates bandwidth in response to the request message based upon the configuration information.

53 Claims, 6 Drawing Sheets

CAPACITY MANAGEMENT IN A BROADBAND SATELLITE COMMUNICATIONS SYSTEM

BACKGROUND OF THE INVENTION

1. Field of the Invention

The present invention relates generally to communication systems, and is more particularly related to managing system capacity in a satellite communications system.

2. Discussion of the Background

As society, in general, becomes increasingly reliant on communication networks to conduct a variety of activities, ranging from business transactions to personal entertainment, operators of these communication networks continually face the challenges of managing and optimizing use of network capacity as well as ensuring network availability to a diverse set of users with varying traffic requirements. The maturity of electronic commerce and acceptance of the Internet as a daily tool by millions of users have stimulated the emergence of numerous service providers.

Given the competitiveness of the Internet access provider market, service providers require support by the network operator or wholesaler, such that they may differentiate their services. Accordingly, the operators need to have the flexibility to accommodate the varied set of capacity requirements associated with the individual service providers. Such flexibility is dependent upon how efficiently the operator can manage the system capacity of the communication network, so that the numerous service providers can be guaranteed that their users will receive a predetermined level of service.

Satellite communications systems have emerged as an accessible and reliable network infrastructure that can support the exchange of voice, video, and data traffic. Capacity management is particularly critical in a satellite communications system, as the satellite possesses finite system capacity (i.e., total bandwidth), which cannot be readily upgraded. Because the capacity needs of service providers continually change, the operator is required to implement a capacity management system that can dynamically adapt to such changes.

Based on the foregoing, there is a clear need for improved approaches for managing system capacity over a satellite communications system.

There is also a need to enhance efficient utilization of the system capacity.

There is also a need to employ a flexible architecture that provides increased network functionalities.

There is a further need to dynamically adapt to changing capacity requirements of the service providers.

Based on the need to improve system efficiency, an approach for managing system capacity using integrated and interactive processes is highly desirable.

SUMMARY OF THE INVENTION

According to one aspect of the invention, a method is provided for managing system capacity of a communication system. The method includes receiving system capacity resource configuration data that reflect capacity requirements of a service provider. The method also includes generating a capacity plan based upon the capacity resource configuration data and the predetermined profile, and configuring a remote processor according to the capacity plan. The remote processor is configured to process bandwidth request messages from the terminal and to selectively allocate bandwidth to the terminal in response to the bandwidth request messages. Under this approach, the capacity requirements of multiple service providers can be efficiently managed.

According to another aspect of the invention, a communication hub for managing system capacity of a communication system comprises an operator interface that is configured to receive system capacity resource configuration data that reflect capacity requirements of a service provider. A service provider interface is configured to receive a predetermined profile of a terminal that is served by the communication system. A computer system communicates with the operator interface and the service provider interface. The computer system is configured to generate a capacity plan based upon the capacity resource configuration data and the predetermined profile, which includes service class information and rate information. The computer system configures a remote processor according to the capacity plan. The remote processor is configured to process bandwidth request messages from the terminal and to selectively allocate bandwidth to the terminal in response to the bandwidth request messages. The above arrangement advantageously adapts dynamically to changing capacity and service requirements of the service providers.

According to another aspect of the invention, a satellite communications system for providing communication services to a region comprises a terminal that is located within the region and is configured to transmit and receive signals over a satellite having a payload that processes the signals. The terminal has a predetermined profile that includes service class information and rate information. A hub is configured to receive system capacity resource configuration data that reflect capacity requirements of a service provider and to determine partitioning of system capacity over the region based upon the system capacity resource configuration data. The hub transmits configuration information to the payload of the satellite according to the determined partitions. The terminal is configured to transmit a bandwidth request message to the payload. The payload selectively allocates bandwidth in response to the request message based upon the configuration information. Under this arrangement, the operator of the communication system can ensure that the agreements with the multiple service providers can be efficiently managed and executed.

In yet another aspect of the invention, a satellite communications system for providing communication services comprises means for receiving system capacity resource configuration data that reflect capacity requirements of a service provider. The system also includes means for receiving a predetermined profile of a terminal that is served by the communication system. The predetermined profile includes service class information and rate information. In addition, the system includes means for generating a capacity plan based upon the capacity resource configuration data and the predetermined profile. Further, the system includes means for configuring a remote processor according to the capacity plan. The remote processor is configured to process bandwidth request messages from the terminal and to selectively allocate bandwidth to the terminal in response to the bandwidth request messages. The above arrangement advantageously provides an integrated and automated approach to managing system capacity.

In yet another aspect of the invention, a computer-readable medium carrying one or more sequences of one or more instructions for managing system capacity of a communication system is disclosed. The one or more sequences of one or more instructions include instructions which, when executed by one or more processors, cause the one or more processors to perform the step of receiving system capacity resource configuration data that reflect capacity requirements of a service provider. Another step includes receiving a predetermined profile of a terminal that is served by the communication system. The predetermined profile includes service class information and rate information. Additionally, other steps include generating a capacity plan based upon the capacity resource configuration data and the predetermined profile, and configuring a remote processor according to the capacity plan. The remote processor is configured to process bandwidth request messages from the terminal and to selectively allocate bandwidth to the terminal in response to the bandwidth request messages. This approach advantageously provides efficient partitioning of system capacity among multiple service providers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides an efficient approach to the management of system capacity. A communication hub, which may include multiple processors (i.e., computers) that communicate over a local area network, provides capacity management functionalities. The hub provides an operator interface that receives system capacity resource configuration data, which reflect the capacity requirements of a particular service provider. Additionally, a service provider interface within the hub receives a predetermined profile of a terminal. A computer system communicates with the operator interface and the service provider interface. The computer system generates a capacity plan based upon the capacity resource configuration data and the predetermined profile of the terminal. The resource configuration data and the predetermined profile are stored in one or more databases that are local to the hub. The computer system configures a remote processor according to the capacity plan. The remote processor handles bandwidth request messages from the terminal and selectively allocates bandwidth to the terminal in response to the bandwidth request messages.

Figure 1:
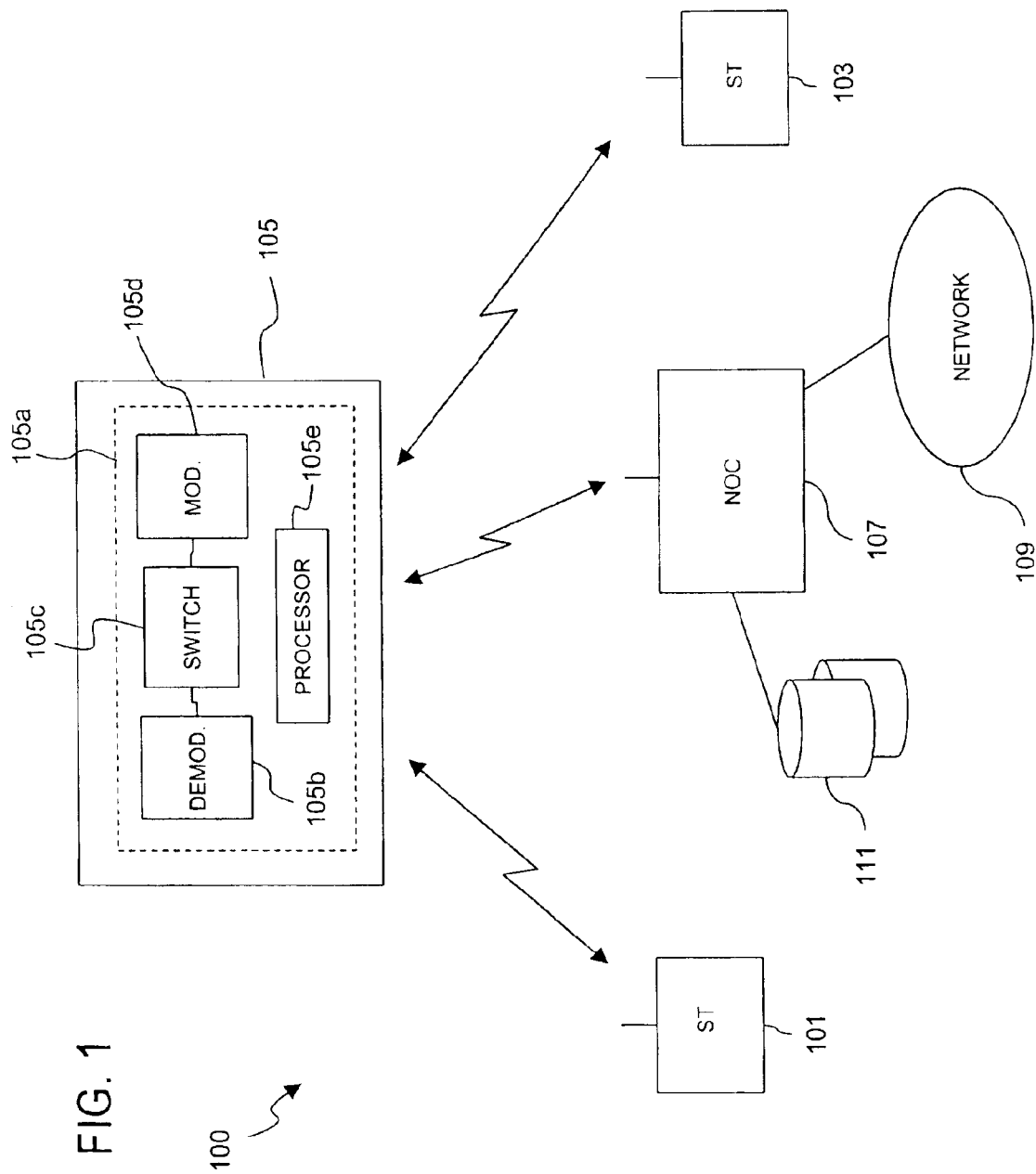
FIG. 1 is a block diagram of a satellite communications system that performs capacity management, in accordance with an embodiment of the present invention.

FIG. 1 shows the interaction among the satellite terminals (STs), the satellite, and the Network Operations Center (NOC 107) in a satellite communications system, according to an embodiment of the present invention. As shown, a satellite communications system 100 includes STs 101 and 103, a satellite 105, and a NOC 107 (or hub) 107. As used herein, the term "terminal" may refer to a satellite terminal. The satellite 105 has a payload 105a that includes a demodulator 105b that demodulates received signals from STs 101 and 103, a switch 105c that forwards the demodulated signal to an appropriate transponder (not shown), and a modulator 105d that modulates the signal from switch 105c for transmission over the transponder (not shown). Included in the payload 105a is a processor 105e that performs such functions as capacity management functions; this functionality is more fully described later. In this example, STs 101 and 103 are served by a common network service provider (NSP), which acquires the necessary system capacity from the operator of the system 100 (i.e., wholesaler).

A connection is defined to be an agreement between the NOC 107 and an individual ST 101 and 103 to allow that ST 101 and 103 to send packets on a satellite uplink at a constant rate to a specific destination ST (or group of STs for a multicast). Thus, a connection may be simplex—a one-way flow of packets. However, two simplex connections can be combined to give a full-duplex connection, possibly at different rates in the two directions.

There are two parts to the "agreement" that form a connection—admission control at the NOC107, and an uplink rate allocation from the payload 105a. A ST 101 and 103 requires authorization from the NOC 107 before the ST can make a request to the payload 105a for an uplink allocation. However, once a ST 101 and 103 has received authorization from the NOC 107, the ST 101 and 103 is able to get a rate allocation from the payload 105a because the NOC 107 keeps track of the total uplink (and downlink) bandwidth available for connections and will block a connection request if there is insufficient satellite capacity available to satisfy the request.

The system 100 supports two types of connections: a scheduled connection and an on-demand connection. A scheduled connection is a connection that an NSP can configure through the NOC 107 to be established permanently, for a recurring set of time periods, or for a single instance. The NOC 107 blocks configuration of a scheduled connection if the connection would violate the admission control rules established at the NOC 107. If NOC 107 does allow a scheduled connection to be configured, the NOC 107 sends the specifications for the connection to the ST 101 and 103 that establishes the connection. When the connection needs to be established, the ST 101 and 103 requests authorization for the connection (including its rate and destination) from the NOC 107 and then requests a rate allocation from the payload 105a. Since the connection was previously scheduled, the NOC 107 automatically authorizes the connection. STs 101 and 103 may establish on-demand connections based on information available at the ST 101 and 103. The NOC 107 does not authorize an on-demand connection if the connection does not meet the admission criteria of the NOC 107.

Further, the system 100 provides a connectionless delivery service, which is defined to be an agreement between the NOC 107 and an individual ST 101 and 103 to allow that ST 101 and 103 to send a specific number of packets on a satellite's uplink to a specific Destination ST.

Figure 2:
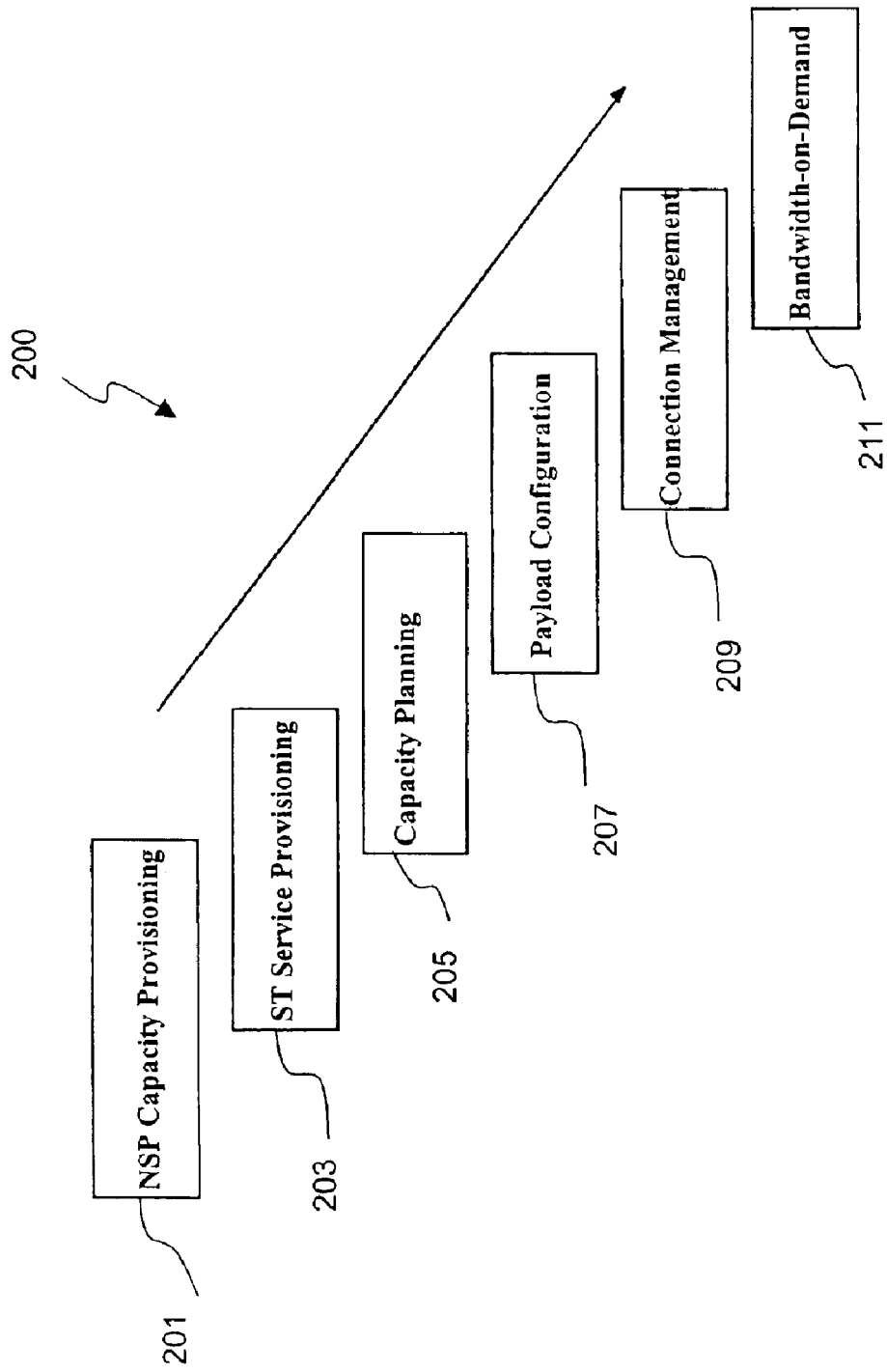
FIG. 2 is a diagram of the capacity management thread utilized in the system of FIG. 1.

Depending the service agreement between STs 101 and 103 and the NSP, these STs 101 and 103 may be configured to communicate between themselves or may access an external network 109 through the NSP. The operator maintains control of the system 100 via the NOC 107. In particular, the NOC 107 manages the system capacity for both uplink channels and downlink channels in the system 100 to ensure compliance with a service level agreement between the operator and the NSP. Capacity management deals with allocation of system resources to ensure that the system 100 can satisfy capacity related agreements made between the wholesaler and service providers. The wholesaler sells capacity to service providers, who in turn sell that capacity to end users who use the capacity via services provided over the system 100. The key processes of the capacity management thread are shown in FIG. 2.

System 100 provides service to numerous service areas, which are covered by a set of polygons that are fixed on the surface of the earth. Downlink polygons, called microcells, are hexagonal in shape as viewed from the spacecraft, with seven microcells clustered together to form an uplink polygon, called a cell. As used herein, the term microcell is used synonymously with the term downlink cell. The satellite generates a set of uplink beams that each encloses a cell. It also generates a set of downlink beams that each encloses a microcell.

Polarization is employed to maximize the system capacity. The polarization is fixed, as are the satellite beams that serve the cells. Adjacent cells or cells that are separated by less than one cell diameter of the same polarization must split the spectrum; that is, such cells cannot use the same frequencies. However, adjacent cells on opposite polarization can use the same frequencies. The downlink beam operates on two polarizations simultaneously so that the frequency reuse ratio is 2:1. A total of 24 transmitters, 12 on RHC (Right-Hand Circular) polarization and twelve on the LHC (Left-Hand Circular) polarization serve the downlink cells. The transmitters serve all microcells by time hopping from microcell to microcell.

Spot beams can be transmitted simultaneously on each polarization subject to minimum microcell separation distance limitations. Beams on the same polarization may be sufficiently separated spatially to avoid unacceptable co-channel interference. Another co-polarized beam is not allowed to transmit to another microcell within an ellipse or else excessive interference may occur. The "keep-out" areas apply separately and independently for the two polarizations; the link budgets account for any cross-polarization interference that may occur.

The uplink capacity resources of system, according to an exemplary embodiment, can be partitioned into multiple increments of capacity that can be allocated among the uplink cells. Uplink channels have a Time Division Multiple Access (TDMA) structure. Each capacity increment is implemented on the payload 105a as a demodulator 105b providing numerous communication channels of 512 kbps capacity, for example. In an exemplary embodiment, demodulator channels can be combined into groups of 32 channels to provide single ST uplink rates of 16 Mbps, and groups of 4 channels to provide single ST uplink rates of 2 Mbps. Assignment of demodulators 105b to uplink cells and configuration of demodulator carrier rates are controlled by the NOC 107.

Downlink capacity of system 100 may be defined in terms of broadcast and point-to-point capacity. The downlink capacity equation is defined as follows:

$d_{ptp}$=point-to-point duty cycle $1.0>=d_{ptp}>=0$ $C_{ptp}$=point-to-point capacity $C_{ptp}$=10 Gbps*$d_{ptp}$ $C_c$=broadcast capacity $C_c$=286.8 Mbps*$(1-d_{ptp})$ In an exemplary embodiment, the broadcast capacity is configurable in increments of about 6.373 Mbps, utilizing a TDM structure. Based on-demand for broadcast services over the broadcast region, the operator determines the value of $d_{ptp}$. The NOC 107 may command the payload to implement the point-to-point duty cycle as determined by the operator. The NOC 107 employs the current value of $d_{ptp}$ as necessary when managing downlink and uplink capacity. Additionally, the NOC 107 may use the planned value of $d_{ptp}$ when planning downlink and uplink capacity allocations.

A packet replication capability (i.e., multicasting) exists on the payload 105a that replicates packets to multiple destination cells. The payload 105a is capable of processing up to 512 independent multicast replication groups, with each group consisting of up to 40 destination microcells. The NOC 107 can instruct the payload 105a to configure the multicast replication tables based on multicast connection setup requests. In order for the NOC 107 to ensure that the packet replication capacity limit is not exceeded, all multicast connections and replications groups are configured by the NOC 107. The NOC 107 does not allow a multicast connection to be set up if the connection would result in exceeding the packet replication throughput.

The point-to-point downlink of system 100 involves numerous downlink microcells that are overlaid within the uplink cells. Unlike the uplink, whereby demodulators 105b are assigned to an uplink cell in order to provide capacity to the cell, the downlink capacity is automatically directed to where it is most needed by the use of hopping spot beams. As mentioned previously, twenty-four (12 per polarization) hopping beams are used to send packets received on the uplink to the their destination.

Capacity analysis and planning functions can determine downlink traffic demands based on scheduled connections, traffic models, and trend information. The analysis can be used to determine if the allocation of downlink capacity to a ST 101 and 103 is likely to be met under normal traffic conditions. During system operation, the allocation of uplink capacity to a ST 101 and 103 may be made with knowledge of the available of downlink capacity. The NOC 107 is aware of NSP downlink capacity allocations and how much connection-oriented traffic has been granted to STs in each downlink cell. However, since connectionless traffic is not granted by the NOC 107, the NOC 107 does not have complete knowledge or control over current downlink allocations.

The system 100 provides the capability for a specific portion of the total available capacity in each uplink cell to be allocated to scheduled connection oriented service. The system 100 also provides the capability to statistically allocate a portion of the total available capacity in each downlink cell to scheduled connection oriented service, which can be shared by multiple NSPs that subscribe to scheduled connection oriented service. The system 100 provides the capability to allocate to each NSP on-demand connection oriented capacity in each uplink cell to which the NSP has subscribed, and the capability to statistically allocate to each NSP on-demand connection oriented capacity in each downlink cell to which the NSP has subscribed.

In addition, the system 100 enables a specific portion of the total available capacity to be allocated exclusively for connectionless traffic that is then shared by all NSPs. An NSP's on-demand connection-oriented capacity, which is not in use by on-demand connection-oriented service, is pooled across all NSPs. The pooled capacity is available for connectionless service to STs 101 and 103 of all NSPs in a cell. If the on-demand connection oriented service, which requires the capacity within an NSP's service area that is currently pooled for connectionless traffic, is activated, then such capacity may be used for the on-demand connection oriented service. Individual NSP capacity allocations are managed from an undifferentiated pool of total capacity allocated to each uplink cell. Individual NSP capacity allocations are managed from an undifferentiated pool of total capacity allocated to each downlink cell.

According to one embodiment of the present invention, the traffic is assigned the following priorities (from highest to lowest): connection oriented traffic, high priority connectionless traffic, and low priority connectionless traffic. The NSP can configure the individual service classes that are allowed or denied at each ST 101 and 103 that is under control of the NSP. Access to these services is configurable on a time of day basis; each ST 101 and 103 has its own service activation schedule.

The system 100 provides a configurable mechanism for allocating network communications resources to meet capacity requirements. The system 100 accepts information related to capacity requirements for connection oriented and connectionless services from the NSPs. Traffic demands in the region can be satisfied dynamically over time by changing resource allocation to the individual cells and STs 101 and 103. The system 100 plans capacity allocations by service class, as more fully described later. Preemption of existing connections is supported by the system 100 to meet capacity allocations at the NSP level. It should be noted that the system 100 permits overlapping of NSP service areas.

System 100 performs a number of functions to manage capacity. The responsibilities for performing capacity management functions are shared among the payload 105a, ST (101 and 103), and NOC 107. Partitioning of capacity management functions among these components is driven by allocation requirements, the architecture of the system 100, and performance.

The coverage region of system 100 includes numerous uplink cells (e.g., 112 cells). The amount of uplink capacity in each cell is determined by the number of demodulators 105b that are assigned to the particular cell. According to an exemplary embodiment, a total of 256 demodulators 105b are available for assignment, in which 224 demodulators 105b may be assigned to the cells at any given time. Each demodulator provides 96 512 kbps channels of capacity. A cell can be assigned 0 to 8 demodulators 105b.

The first step in planning capacity allocations is to determine how the 224 capacity increments are to be distributed over the 112 cells. The allocation is largely dependent upon the traffic demands of the system 100; these traffic demands change over time by time of day and day of week. According to an embodiment of the present invention, the NOC 107 permits changing of capacity resource allocations among cells once per hour. Further, the NOC 107 provides the capability to specify capacity allocations that repeat over time.

In this example, it is assumed that the uplink bandwidth of 500 MHz is divided into eight equal subbands of 62.5 MHz. Thirty two demodulators 105b are available in each subband. A demodulator 105b is assignable to any uplink cell; however, the demodulator 105b may not be assigned simultaneously to more than one cell. That is, demodulators 105b can be reassigned to new cells, but cannot be shared between two cells.

The task of assigning frequencies to uplink cells can be viewed as two distinct tasks. First, frequency subbands are allocated to uplink cells, subject to system constraints. Second, physical demodulators 105b are assigned to the cell according to the subband allocation, subject to constraints imposed by the microwave switch matrix 105c on the payload 105a.

Subband assignments to uplink cells are determined by the operator based on the amount of uplink capacity that is required in each cell. The NOC 107 ensures that the subband assignments do not violate frequency reuse constraints. When the NOC 107 assigns a subband to the cell of interest, the neighboring cells cannot use the same subband. Furthermore, a subband may only be used once in the cell of interest.

The operator possesses tools that utilize a GUI (Graphical User Interface), whereby the operator sets restrictions for the subband allocations and override any plans generated by the tools. The tool implements an algorithm that distributes the subbands, such that capacity requirements are met while interference and reuse constraints are also satisfied. In addition, the potential number of demodulator movements (i.e., assignments) is minimized when additional subbands need to be allocated to a cell. The reason for the latter is that any movement or re-assignment of a subband demodulator may cause some interruption to the traffic on that demodulator. The inputs to the algorithm are the number of available demodulators 105b in each subband, the capacity demand in each cell expressed in number of demodulators 105b, any specific assignments of subbands to cells, and any exclusions of certain subbands from specific cells.

Once the frequency plan is determined, a check is needed before the plan is converted to a series of commands to program the microwave switch matrix 105c. This check ensures that the switch matrix 105c is capable of configuring the switch 105c to match the generated plan. If the switch 105c cannot be configured according to the generated plan, a list of the offending cells and subbands (i.e., demodulators that cannot physically be configured) is sent to a plan generation module. The plan generation module treats this similar to movements of subbands between cells. The process iterates until a feasible plan that is attained.

Once an initial frequency plan has been created, a number of circumstances exist to alter the plan. For example, the traffic demand may require reallocation of capacity among the cells. Also, a subband may need to be deallocated because of a demodulator failure or because a new subband has been allocated to the cell. Further, a subband swap may be necessitated because of excessive interference.

In updating the frequency plan, the system 100 attempts to keep interference to a minimum (by maximizing C/I) and to minimize the number of demodulator rearrangements. The NOC 107 considers interference, the number of demodulator movements involved, and the hardware constraints when updating the frequency plan. The number of demodulator movements becomes an issue in two ways. First, in order to assign an additional subband to a cell, it may be necessary to reassign the subbands used in cells surrounding it. Second, due to constraints in the switch matrix 105c, it may be necessary to rearrange the switch matrix connections when a change is made.

To accommodate changes in the traffic patterns, the operator deallocates subbands from certain cells, and allocates them to other cells. When a subband needs to be deallocated, the operator removes the subband from the plan through the interface. When assigning a subband, the operator would be able to either specify that an additional subband of any frequency is required in a specific cell, or specify that a specific subband is needed in a given cell. The algorithm, according to an embodiment of the present invention, is to provide the additional subband from those demodulators 105b that are unassigned.

The NOC 107 provides an interface to the operator that performs "what-if" scenarios in moving a subband from one cell to another. Also, actual usage and interference statistics are available for the operator to determine which cells have excess capacity as well as the cells that are running short of capacity.

Each demodulator 105b is capable of demodulating signals in only one subband. In an exemplary embodiment, there are 32 demodulators 105b per subband. Each demodulator 105b can be configured to demodulate signals at carrier rates of 16 Mbps, 2 Mbps, and 512 kbpscarriers. A demodulator 105b can be configured to process three equally spaced 16 Mbps carriers, 24 equally spaced 2 Mbps carriers, 96 equally spaced 512 kbps carriers, or mixtures thereof.

As described earlier, the operator plans capacity allocations by service class by determining how much of each service rate of 16 Mbps, 2 Mbps, and 512 kbpscarriers are to be used for contention, scheduled, on-demand, and connectionless service in each cell. After planning subband and demodulator allocations to uplink cells, the operator determines the layout of the carriers on the assigned demodulators 105b. Each demodulator 105b contains 96 channels (which are denoted 0 through 95), with increasing carrier center frequency. Each channel may be configured for any rate. Reconfiguration of a demodulator's carrier rates could be required when a demodulator is moved from one cell to another or when the NOC 107 determines that based on some conditions such as traffic demands, or interference, a carrier reconfiguration is needed. Irrespective of the reason, the NOC 107 determines how the demodulator 105b is to be configured and instructs the payload 105a to implement the reconfiguration.

Service class allocations are planned by the operator based on Wholesale-NSP capacity agreement parameters (which are translated into system capacity resource configuration data that is supplied to the NOC 107) and traffic analysis. The downlink TDM frame partition determines how much broadcast capacity is available for use over the broadcast region. The NOC 107 provides tools to aid the operator in determining how much broadcast capability is needed based on Wholesale-NSP agreement parameters and traffic analysis. The NOC 107 measures and records the amount of broadcast capacity that is used by connection-oriented and connectionless service.

Two broadcast beams cover the same broadcast region, but in different polarizations. Both beams operate using the same frame partition. The planning associated with the broadcast beams (i.e., determining which STs listen on which polarization) loads both beams as equally as possible. A ST can listen on only one polarization at a time, as selected by ST provisioning.

Capacity management requires that the NOC 107 be able to configure the following payload parameters: demodulator assignment to uplink cells, demodulator carrier layout, downlink TDM frame partition, broadcast beam shape, and bandwidth control process parameters. In order for the NOC 107 to reconfigure capacity over the coverage region, it may be necessary to move several demodulators 105b according to a specific sequence. The payload 105a implements the movement of demodulators 105b, as commanded by the NOC 107. The NOC 107 does not rely on the payload 105a to enforce frequency reuse constraints, other than by performing the movement of subbands in a specified order.

The NOC 107 determines whether the connection-oriented traffic needs to be preempted, or if a remaining demodulator 105b in the source cell (the cell from which a demodulator 105b is being taken) needs to be reconfigured prior to moving a demodulator 105b out of a cell in order to maintain traffic. Preemption, if necessary, is commanded by the NOC 107 prior to removing a demodulator 105b from a cell. Connection-oriented traffic are not discarded by the payload 105a because of payload execution of demodulator configuration commands that are issued by the NOC 107. The NOC 107 may command the payload 105a to reassign all 256 demodulators 105b in a single command sequence.

Demodulator carrier layouts are determined by the operator. The NOC 107 commands the payload 105a to change carrier layouts. As with demodulator-to-cell assignments, the NOC 107 is responsible for making sure that connection-oriented traffic is able to be serviced by the payload 105a when the carrier layout change is implemented.

Updating the downlink TDM frame structure is performed by the payload 105a when commanded by the NOC 107. The operator determines how much bandwidth is needed for broadcast connection-oriented traffic and sends a command to the payload 105a to adjust the frame structure accordingly. The payload 105a periodically transmits the TDM frame structure information in a transmission information message. The NOC 107 sends the request to change the downlink TDM frame structure at least several uplink frames in advance of the time when the change is to take place. The transmission information packet is sent in each uplink frame to provide repeated notifications to STs 101 and 103 that a change is going to occur. Changes to the TDM frame structure may be commanded by the NOC 107 at a maximum rate of once per minute.

As described earlier, the following capacity management databases reside at the NOC 107: a system capacity resource configuration database, NSP capacity allocations database, downlink service allocations database, and ST service provisions database. The system capacity resource configuration database 111 stores the number of demodulators 105b per cell; configuration of each demodulator channel rates; allocation of channels to scheduled services, on-demand services, connectionless services, and overhead; allocation of fixed contention channels, engineering channels, and blocked channels; and point-to-point versus duty cycle information. The NSP capacity allocations database 111 supports a large number of NSPs (e.g., up to 256), and stores uplink service allocations per NSP and ST for each of the following services: scheduled, on-demand, and connectionless. The NOC 107 also maintains a downlink service allocations database 111 for broadcast, multicast, and point-to-point services. Further, the NOC 107 has a ST service provisions database 111 for storing the ST profiles.

The NOC 107 is responsible for managing connection-oriented traffic such that the capacity allocated to an NSP is available for use by the NSP's STs 101 and 103 and that these STs 101 and 103 receive the provisioned services. To manage the system capacity, the NOC 107 needs to know how much capacity is available, how much is allocated to each NSP, and the mapping of STs 101 and 103 to NSPs. The NOC 107 keeps track of how much capacity is currently being used by each NSP's STs 101 and 103. The connection admission control gates, which are checked by NOC 107 when a connection request is received from a ST 101 and 103, include ST level restrictions (NSP specified), ST level restrictions (uplink/downlink cell capacity, multicast, broadcast, PTP), NSP level restrictions (uplink/downlink cell capacity, multicast, broadcast, PTP), uplink and downlink availability, and future scheduled connections' effect on downlink availability. It should be noted that scheduled connections have priority over on-demand connections.

On-demand connection setup requests received by the NOC 107 may be recorded along with the associated status (granted/denied). If a connection is denied, then the reason for denial may also be recorded; e.g., NSP allocation has been exceeded, or capacity is not available.

With respect to the BoD thread 211, the priority of traffic from highest to lowest is as follows: connection-oriented, high priority connectionless, and low priority connectionless. The connection admission control gates, as checked by the NOC 107, ensure that as connection requests are granted, the total connection-oriented capacity granted does not impinge into the connectionless capacity pool. Given the priority of connection-oriented service, the payload 105*a* allocates bandwidth to connection-oriented requests before allocating to connectionless requests. Scheduled changes to NSP capacity allocations may also result in the occurrence of over-allocation of connection-oriented traffic. The NOC 107 may correct this situation by preempting certain connections.

The capacity that is allocated to on-demand connection-oriented traffic can be pooled for use as connectionless traffic if the capacity is not used for on-demand service. After the payload 105*a* allocates bandwidth to connection-oriented traffic, the remaining available capacity can be used for connectionless traffic. The NOC 107 notifies the payload 105*a* of any channels that are unavailable to carry traffic, i.e., contention channels, engineering channels, or blocked channels.

The NOC 107 is responsible for managing connection-oriented downlink capacity, whereby the downlink traffic destination is known at connection setup time. As mentioned earlier, the payload 105*a* manages the broadcast downlink capacity to ensure that the broadcast beams do not become congested due to over-allocation of high priority connectionless service.

FIG. 2 shows the processes involved in the management of capacity in the system of FIG. 1. From a system management perspective the capacity management thread 200 includes a series of processes and functions, starting with the wholesaler (i.e., operator of system 100) provisioning of services for a service provider and ending with the transmission of data packets from an end user ST to other STs over the system 100. The capacity management thread 200 identifies system interactions related to the management of capacity resources including allocation of capacity to NSPs, allocation of demodulators to uplink cells, configuration of demodulator carrier rates, setting the downlink TDM frame partition for point-to-point and broadcast services, ST connections and network admission control functions, and assignment of carriers and timeslots to STs 101 and 103.

The capacity management thread 200, according to an embodiment of the present invention, includes the following processes: NSP capacity provisioning 201, ST service provisioning 203, capacity planning 205, payload configuration 207, connection management 209, and bandwidth-on-demand (BoD) 211. The NSP capacity provisioning thread 201 involves the allocation of capacity by the operator (or wholesaler) to network service providers, wherein the system resource configuration constraints are identified. The ST service provisioning thread 203 deals with the allocation by the NSP of services to STs 101 and 103. The capacity planning thread 205 identifies the sources of information and the responsibilities of the NOC 107 in the generation of capacity plans for upload to the payload 105*a*. The payload configuration thread 207 describes interactions between the NOC 107 and the payload 105*a* for the purpose of configuring capacity resources. The connection management (CM) thread 207 covers ST (e.g., 101 and 103) and NOC 107 interactions that are required to set up connections within the system 100; this thread 207 also includes the responsibilities of the NOC 107 for managing capacity and congestion by allowing connections to be established. The BoD thread 211 deals with the interactions among the payload 105*a*, the NOC 107, and the STs 101 and 103 to support the bandwidth requests by the STs 101 and 103 to the payload 105*a*. These threads 201–211 are more fully described in FIGS. 3–5.

Figure 3:
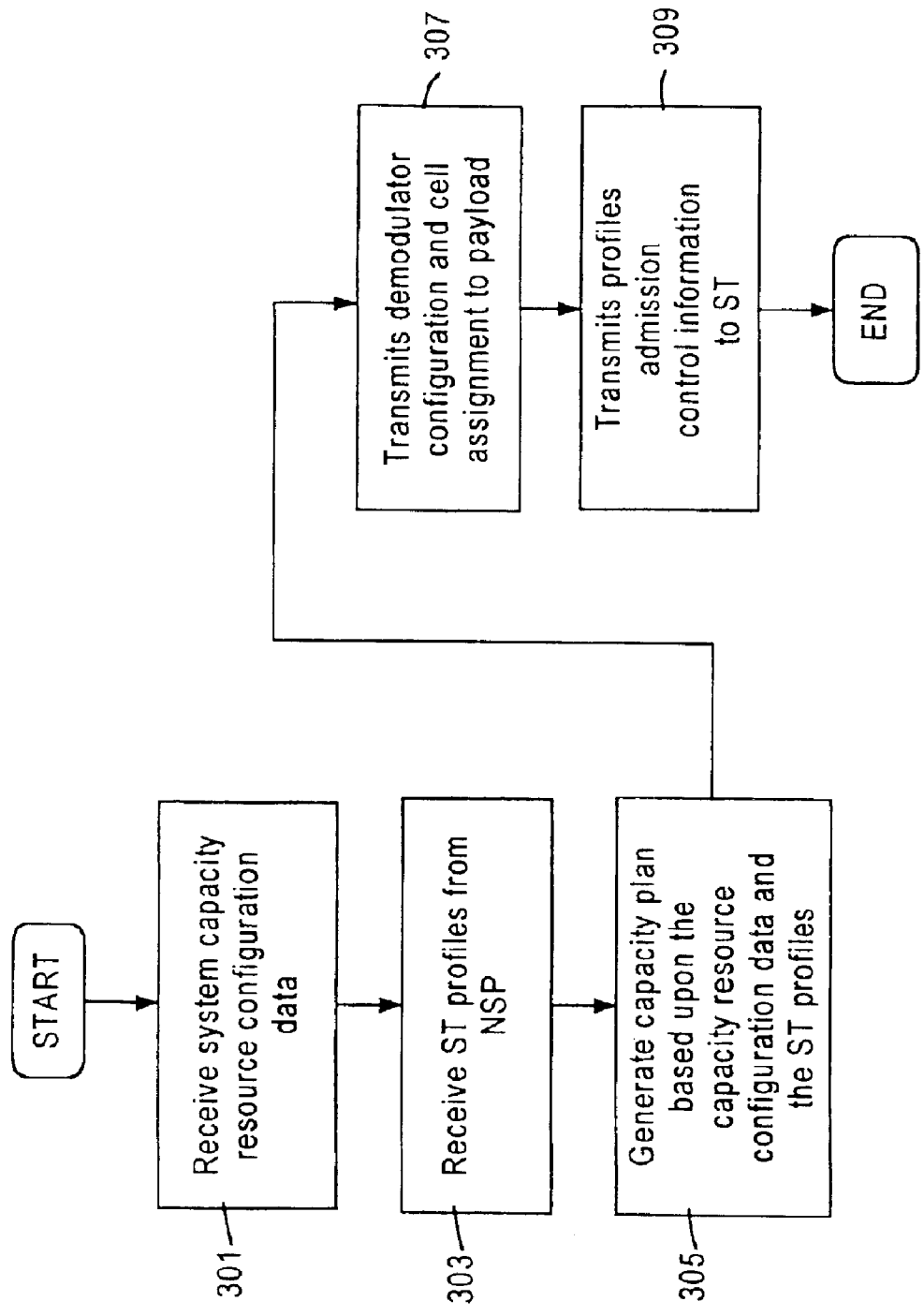
FIG. 3 is a flowchart of the capacity management operation associated with the system of FIG. 1.

FIG. 3 shows a flowchart of the capacity management operation associated with the system of FIG. 1. The NOC 107 provides the wholesaler interface and tools that are used to provision service provider capabilities. The allocation of this function is driven by requirement allocations to the NOC 107. NSP capacity provisions are specified at the NOC 107 for each cell which the NSP has subscribed. This method of NSP provisioning involves specification of bandwidth allocations based on carrier rates (e.g., 10 Mbps @ 2 Mbps carrier; 40 Mbps @ 512 kbps carrier) and service classes (e.g., scheduled, on-demand, connectionless, multicast, broadcast). The NSP capacity provisioning thread 201 provides the wholesaler with complete control over system resource configuration. In step 301, the wholesaler/operator supplies system capacity resource configuration data to the NOC 107; this data is derived from the service agreement that has been negotiated between the NSP and the operator.

In particular, the NSP capacity provisioning thread 201 describes the processes that are required to add a new network service provider to the system 100 or to modify an existing NSP's capacity provisions. The thread 201 begins with receiving request for capacity by a NSP. The thread 201 then performs the required capacity analysis to determine if the service provider's request for capacity can be met. Specification of capacity allocations for the NSP and provision of an interface to be used by the service provider to communicate with the NOC 107 are processed by the NSP capacity provisioning thread 201. This thread 201 also manages the STs 101 and 103 of the NSP.

The ST provisioning thread 203 provides the capability for the NSP to specify the services of the STs 101 and 103 of the NSP. This information is captured in form of ST profiles, which is supplied by the NSP to the NOC 107 (per step 303). The service provider interface and tools used to provision service to STs 101 and 103 are provided by the NOC 107. The NOC 107 provides an interface for service providers to provision ST services. The databases 111 associated with the service provider interface are maintained at the NOC 107. This provides a common data architecture for ST provisioning regardless of which service provider is provisioning the ST, and allows the NOC 107 to manage ST provisioning at the NSP level based on NSP capacity provisions.

Further, the NOC 107 provides capacity planning functions (via the capacity planning thread 205), which determine how system capacity is configured on the payload 105*a* over the region and over time. Capacity analysis provides information to the wholesaler to perform resource allocations and provisioning of services to NSPs. The NOC 107, as in step 305, generates a capacity plan based upon the capacity resource configuration data and the ST profiles.

Payload capacity configuration functions, as performed by the payload configuration thread 207, are shared between the NOC 107 and the payload 105a. The NOC 107 determines how the resources are to be configured over the region and sends commands to the payload 105a to configure the demodulators 105b and the downlink TDM frame partition between broadcast and point-to-point service. That is, the NOC 107 transmits demodulator configuration and cell assignments to the payload 105a (per step 307). The payload 105a is responsible for responding to the NOC 107 configuration requests by implementing the requested changes as and when commanded by the NOC 107.

The connection management (CM) thread 209 performs connection management functions, which are shared among the NOC 107, STs 101 and 103, and payload 105a. Specifically, the NOC 107 performs connection management admission control functions to manage uplink and downlink NSP capacity allocations, per step 309. The payload implements congestion mitigation mechanisms in a real-time environment, allocating uplink resources based on congestion parameters and discarding packets when congestion occurs or is imminent. The role of the STs 101 and 103 is to contend for resources in an orderly fashion as prescribed by the service capabilities, which the ST is provisioned and to respond to congestion information sent from the payload 105a or NOC 107.

With respect to the BoD thread 211, the payload processor 105e controls the carrier and timeslot allocations to the STs 101 and 103. STs 101 and 103 are responsible for requesting bandwidth allocations when needed.

Figure 4:
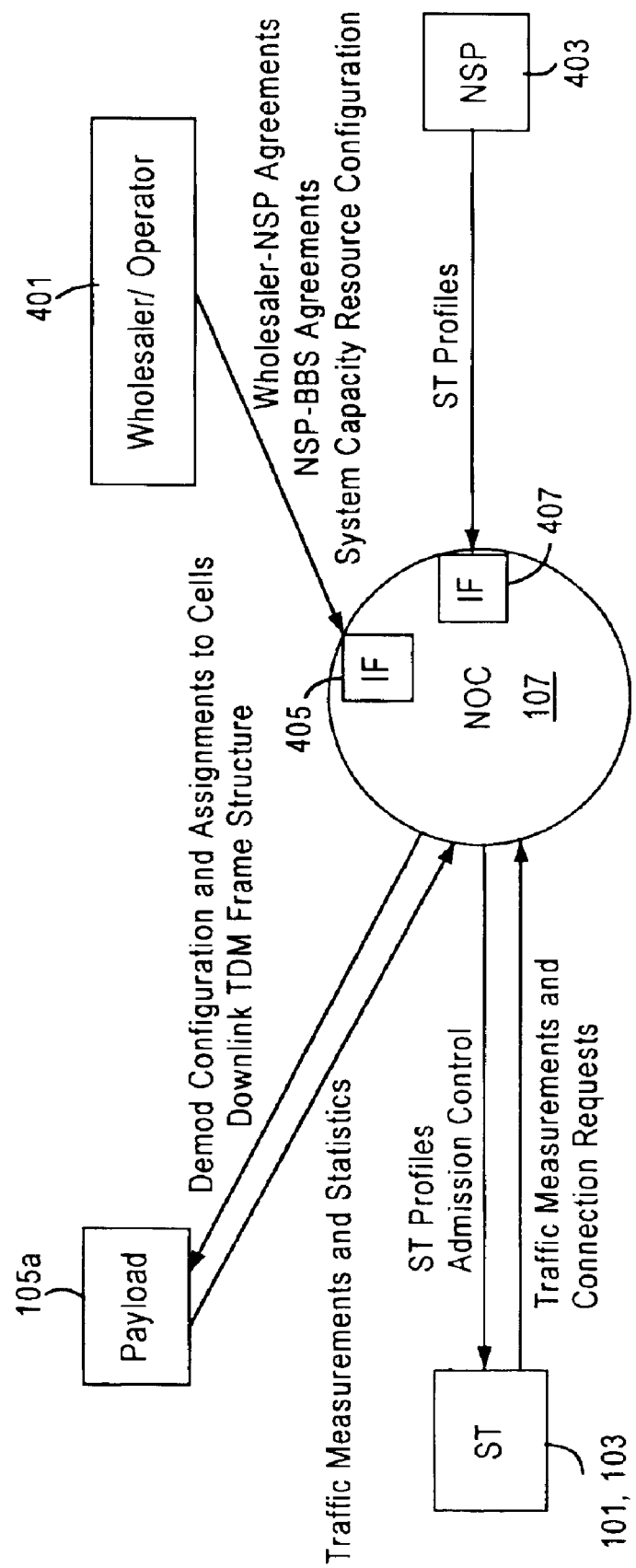
FIG. 4 is a context diagram showing the interaction of the various entities and components of the system of FIG. 1.

FIG. 4 shows the system level capacity management context diagram, according to an embodiment of the present invention. As evident from the above discussion, the NOC 107 plays a central role in managing system capacity. For the purposes of explanation, it is assumed that capacity resources are initially configured by the system 100 to support a uniform distribution of capacity over the coverage region. Alternatively, the initial configuration may be based on any type of distribution that the operator deems appropriate; e.g., a distribution based on population density. The capacity management function of the system 100 involves determining payload capacity resource configurations, determining capacity allocation to the NSPs based on resource configuration parameters, and managing capacity during operation to ensure that the STs of the NSP receive the services allocated to the particular NSP.

The initial step in managing system capacity is the provisioning of capacity to NSPs. Three categories of information are provided to the NOC 107 for use in managing this capacity. First, resource configuration data provides information that specify how the capacity in each cell is configured for each rate and service class provided by the system 100. This configuration data is based largely upon the negotiated service agreements between the wholesaler 401 and the NSP 403.

Specification of contractual agreements between the wholesaler and NSPs vary from NSP to NSP, depending on circumstances normally beyond the control of the NOC 107. However, each Wholesaler-NSP contract specification may be translated into a specification of the capacity allocations to the NSP. The NOC 107 provides an operator interface (I/F) 405 for the wholesaler to specify NSP capacity allocations related to Wholesaler-NSP contracts. Contract terms and agreements may also specify capacity allocations that change over the life of the contract or periodically, e.g., based on time of day. Therefore, the NOC 107 allows the capacity agreement parameters to be specified in hourly increments and updated over time without disrupting service or affecting current allocations of the NSP. According to one embodiment of the present invention, if the NSP's allocation is decreased, then the NOC 107 might preempt a portion or all of the NSP's connections in order to meet capacity requirements at the system or NSP level. Scheduled connections that have yet to be activated could also be affected by decreases in NSP level allocations.

The NSP capacity allocation parameters that need to be specified to the NOC 107 include uplink parameters, downlink parameters, and various miscellaneous service parameters. In each uplink cell in which the NSP has subscribed for service, the parameters, according to one embodiment of the present invention, are as follows: dedicated and shared scheduled capacity per 16 Mbps, 2 Mbps, and 512 kbps rates; dedicated and shared on-demand capacity per 16 Mbps, 2 Mbps, and 512 kbps rates; connectionless capacity per 16 Mbps, 2 Mbps, and 512 kbps rates; number of STs that the NSP may provision per microcell; connectionless priorities allowed for the NSP's STs; number of STs that may send data traffic on contention channels.

The downlink parameters include dedicated and shared scheduled capacity, and dedicated and shared on-demand capacity. The capacity agreement parameters may include the following: broadcast downlink capacity per polarization, number of multicast replication groups allocated for the NSP, total multicast replication throughput for all simultaneous NSP multicast connections, capacity to allow burst over CIR (Committed Information Rate) service at 16 Mbps, 2 Mbps, 512 kbps connection rates, and ST allocations.

Each NSP's capacity allocations are independent of allocations to other NSPs. Also, as indicated previously, the NSP service areas may overlap. An NSP's capacity provisions specify uplink capacity, downlink capacity, and services that the NSP's STs are allowed to access within the provisioned capacity limits of the NSP.

The second category of information used to manage capacity is NSP capacity allocations. NSP capacity allocation parameters are used during system operations to manage and enforce the allocation of capacity to STs 101 at the NSP level; that is, the system 100 provides the NSP with the capability to control the services that are provided to STs 101. For example, the amount of uplink bandwidth that the STs 101 and 103 of a given NSP are allowed to use in a given uplink cell is specified at the NSP level. As mentioned above, this information may be provided to the NOC 107 as a part of the operator-NSP agreement parameters in form of ST profiles. Such information may be supplied to the NOC 107 using a service provider interface (I/F) 407.

The third category of information that is used to manage capacity relates to the individual STs 101 and 103. The NSP may provide ST capacity allocations within the constraints of the NSP's capacity allocations. ST capacity allocations are made from the pool of capacity allocated to the NSP, and therefore, share the same or fewer service classes as those allocated to the NSP. A ST 101 and 103 may not be allocated services that the NSP has not been allocated. Once the capacity and service provisioning information has been specified, the NOC 107, STs 101 and 103, and payload 105a cooperate in providing communication services to STs 101 and 103.

According to an embodiment of the present invention, the NOC 107 provides NSP ST capacity allocation and management functions. As evident from the above discussion, ST capacity allocations are specified by the NSP. This approach advantageously provides the NSP with the capability to allocate capacity to individual STs 101 and 103 without requiring the NSP to develop a management system of its own. As a consequence, any NSP may acquire this capability without having to incur development, operation, and maintenance costs.

The system 100 supports over-subscription of the on-demand and connectionless capacity in an uplink cell. From an NSP capacity allocation perspective, over-subscription is accomplished by allocating more capacity to NSPs than what is available for service in the cell. To accomplish over-subscription, the system 100 dedicates configurable amounts of capacity per NSP from dedicated and shared capacity pools, in which the shared capacity may be oversubscribed. Dedicated capacity is available for use only by the NSP's STs 101 and 103. If this dedicated capacity was not in use, it could be pooled for connectionless traffic (but not for connection-oriented traffic). Over-subscribed capacity is allocated from the shared pool of on-demand capacity and is granted on a first come, first served basis. The advantage of this approach is that the wholesaler can guarantee a configurable amount of capacity to an NSP.

The NSP capacity provisioning thread 201 involves allocation of uplink and downlink capacity to NSPs for scheduled, on-demand, and connectionless service. The service types include connection-oriented and connectionless service. According to an embodiment of the present invention, the capacity management thread 200 categorizes the basic service types per uplink rate (e.g., 16 Mbps, 2 Mbps, and 512 kbps) as scheduled, on-demand, high priority connectionless, and,low priority connectionless service, and downlink service as broadcast, multicast, and point to point. Downlink service is allocated independently of uplink service; however, the NOC 107 manages both services collectively.

The following table shows the exemplary types of services that can be allocated to an NSP. All service types can be allocated to NSPs and managed at the NSP level, at any of the configurable rates. In an exemplary embodiment, connectionless traffic may not be multicast.

TABLE 1

| | Uplink | | | |
|---|---|---|---|---|
| | Connection Oriented | | Connectionless | |
| | | | High | |
| Downlink | Schedule | On-demand | Priority | Low Priority |
| Broadcast | Yes | Yes | Yes | No |
| Multicast | Yes | Yes | No | No |
| Point-to-Point | Yes | Yes | Yes | Yes |

On-demand connection-oriented capacity is allocated to an NSP in each uplink cell which the NSP has subscribed. Configurable amounts of dedicated and shared capacity are allocated to each NSP from the on-demand pool of capacity in the cell. The NOC 107 manages an NSP's capacity allocations in each uplink cell independent of the NSP's allocations in other cells.

Point-to-point, multicast, and broadcast services are managed as three separate allocations of downlink capacity. The NOC 107 provides the ability for the wholesaler to specify an amount of on-demand capacity that is allocated to each NSP for the following downlink services: downlink microcell point-to-point service, multicast service, number of active multicast groups, and total multicast throughput.

The system 100 supports statistical allocation of downlink capacity to each NSP in each downlink cell to which the NSP has subscribed As part of the Wholesale-NSP agreement parameters, an amount of capacity may be allocated in each downlink cell (microcell or broadcast beam). As connections are established in system 100, the NOC 107 keeps track of the downlink capacity currently being used in each cell by the NSP's STs 101 and 103. As long as capacity is available, connections are granted even if they result in the NSP's downlink allocation being exceeded. Downlink capacity availability may be offset (or reserved) based on dedicated NSP downlink allocations of capacity. If a connection request cannot be granted due to lack of downlink capacity, then the NOC 107 denies the connection request. The connection record logs the connection as denied because of unavailable downlink capacity. Statistical average downlink capacity used by the NSP's STs over the NSP's coverage area can be determined by analyzing the connection records.

The scheduled connection-oriented capacity allocation in each uplink cell may be shared by all NSPs subscribing to scheduled connection-oriented service. As mentioned above, interface 405 is provided by the NOC 107 to configure scheduled connections. According to an embodiment of the present invention, the interface resides at the NOC 107; alternatively, the interface may exist at an external entity, such as an NSP or ST. In either case, the database 111 of scheduled connections would reside at the NOC 107.

Scheduled capacity may be allocated to NSPs using the shared capacity pool or part dedicated, part shared methods, as described previously. Another approach is to employ a fully dedicated allocation approach. In such an approach, capacity that is allocated to an NSP would be available for use only by STs 101 and 103 that are owned by the NSP. The scheduled capacity could be pooled for connectionless service when it was not being used for scheduled connections. However, the unused scheduled capacity could not be used to service connection-oriented traffic, and oversubscription of the scheduled capacity pool would not be allowed. The NOC 107 records all transactions made in the scheduled connection database, and permits the NSP to cancel a scheduled connection. Billing for cancelled connections, for example, may be performed at the wholesaler's discretion. In an exemplary embodiment, the NOC 107 allows scheduled connections to be made up to a year in advance and for a duration of up to a year.

Connectionless service in the system 100 is defined as follows. In such a service, data can be transmitted by a ST without prior path setup—in contrast to connection-oriented traffic, which must pass connection management procedures at the NOC 107 prior to being allowed on the system 100. Depending on the service, STs may initiate connectionless bandwidth requests directly to the payload 105a without the request being granted by the NOC 107. Also, unlike connection-oriented traffic, which has a specified fixed rate, connectionless service allocations may be bursty. With connectionless service, two priorities are defined: high priority and low priority. In low priority traffic, the bandwidth request does not specify the destination of the data; however, high priority traffic does indicate the downlink destination in the bandwidth request. The high and low priority connectionless service is configurable on a ST-by-ST basis. The Wholesale-NSP capacity agreement parameters may include limits on the number of STs 101 and 103 that an NSP is allowed to provision for connectionless service in each downlink cell by priority. The ST profile information may specify whether the services that are permitted for the ST 101 and 103 include high and/or low priority connectionless service.

The payload processor 105e executes a bandwidth-on-demand (BoD) process (as part of the BoD thread 211) that allocates connectionless bandwidth to STs 101 and 103. With respect to managing connectionless service, the NOC 107 limits the number of connections granted in each uplink cell so that the connection-oriented allocations made by the BoD process do not affect the connectionless capacity pool. The amount of connectionless service on the broadcast beam is specified and managed so the broadcast beam does become congested by too many connectionless service allocations. One way to managing this service is to limit the service strictly to high priority connectionless, in which the bandwidth requests specify the downlink destinations. Thus, the BoD process manages the broadcast beam based on the TDM frame partition, connection-oriented service on the broadcast beam, and number of connectionless service requests that are queued for the broadcast beam. The BoD function limits the connectionless bandwidth allocations that are made in each frame to a NOC 107 specified limit.

The NOC 107 transmits ST profile admission control information to the ST 101 to inform the ST 101 of the capabilities and services that are granted to it by the NSP 403 under the service agreement between the user and the NSP 403. The ST profile provides service class information and rate information. This profile about a ST's service capabilities is forwarded to the ST 101 and 103 during ST registration. Accordingly, the NSP 403 may restrict the ST 101 to a certain transmission rate as well as to whom the ST 101 may communicate with. The ability to use broadcast services, for instance, may be limited to specific STs, and the amount of broadcast capacity per ST may vary from one ST to another based on NSP specified provisions of services to the STs. For example, if the NSP 403 provides Internet access services, the NSP 403 may permit the ST 101 to communicate only through the NSP 403.

The role of the payload 105a in capacity management is to allocate carriers and timeslots to STs 101 and 103 in response to rate and volume requests sent by STs 101 and 103 to the payload 105a. The NOC 107 manages ST connection setup requests such that all rate requests received by the payload 105a are serviceable. The payload 105a supplies traffic measurements and statistics to the NOC 107. After the NOC 107 receives the requirements from wholesaler and NSP, the NOC 107 generates and uploads configuration information to the payload 105a. Such configuration information may include demodulator configuration data, demodulator cell assignments, and downlink TDM frame structure information.

To initiate communication, the ST 101 sends connection requests (i.e., bandwidth allocation requests) to the NOC 107; the ST 101 may also forward traffic measurements/statistics to the NOC 107 to assist the NOC 107 with management of the system capacity.

To manage system capacity efficiently and effectively, the NOC 107 maintains the three categories of information, as discussed above, in one or more capacity management databases 111 (FIG. 1), which, in an exemplary embodiment, is locally situated within the NOC 107. If the NOC 107 were required to access information from an NSP in order to make decisions related to capacity, system performance would be negatively impacted. The capacity management databases 111 may include a capacity resource configuration database, a NSP capacity allocations database, and a ST service allocations database. The capacity resource configuration database 111 specifies when information about new capacity allocations is formatted and provided to the satellite 105 as frequency plans and to the NOC 107. The NSP capacity allocations database 111 store NSP capacity allocation parameters for each of the NSPs. The ST service allocations database 111 house the ST profiles.

The ST service provisioning thread 203 permits the NSP to specify the ST profiles over an interface that is provided by the NOC 107. For each ST 101 and 103, the NSP provide several pieces of information, including the following capacity-related parameters: ST type, ST location, scheduled connection parameters, on-demand service parameters, connectionless service parameters, multicast source parameters, broadcast parameters, and contention channel traffic usage parameters. The NOC 107 uses the ST type parameter to determine what carrier rates the ST supports in order to validate further ST provisioning parameters. As regards the ST location parameters, the ST's latitude and longitude are used by NOC 107 to determine in which uplink and downlink cell the ST 101 and 103 is located. This information may be received from the ST 101 and 103 during ST commissioning. By way of example, a ST installer may provide the information to the ST 101 and 103; location data is not provided by the ST's NSP as part of the NSP provisioning parameters. The NSP is responsible for scheduling connections for its ST 101 and 103, including time, rate, priority, source, and destination of traffic. The NOC 107 checks, over time, whether the scheduled connection parameters fall within NSP capacity provisions.

The NSP selectively supplies the NOC 107 with various service parameters. The NSP specifies whether the ST (e.g., 101 and 103) is allowed to make on-demand connections, the rate and priority at which such connections are allowed, and the downlink destinations. It should be noted that scheduled and on-demand connection priorities that are specified by an NSP are relative to the STs 101 and 103 that are owned by the NSP, and are independent of priorities specified by other NSPs. In addition, the NSP specifies whether the ST 101 and 103 is allowed to use connectionless services, including carrier rate (e.g., 16 Mbps, 2 Mbps, or 512 kbps) and priority (e.g., high or low). If the ST is provided with multicasting capability, the NSP specifies rate and multicast group information. The NSP may also indicate whether the ST subscribes to on-demand broadcast and/or connectionless broadcast service, in which case, NSP specifies the rates, the broadcast beam(s) that the ST is allowed to send traffic on, and the beam that the ST is to listen to for broadcasts. Further, the NSP specifies whether the ST is allowed to send user traffic on the contention channels. ST type and location are somewhat static in that they typically will not change over time for a given end user. The other parameters, however, may change over time; and it is the responsibility of the NOC 107 to monitor such changes and to ensure that all ST service provisions are within the scope of the NSP's capacity provisions.

As part of the capacity planning thread 205, the NOC 107 determines the system capacity resource configuration and capacity allocations based upon parameters that are supplied by the operator. These parameters include uplink capacity per cell, subband-to-cell allocations, demodulator-to-cell assignments, demodulator channel configurations (e.g., for 16 Mbps, 2 Mbps, and 512 kbps rates), service class allocations for each channel rate, specification of channels allocated for contention and blocked channels, and downlink TDM frame structure.

Additionally, the NOC 107 is responsible for initiating the reconfiguration of system capacity resources based on resource configuration parameters provided by the operator. To accomplish this function, the NOC 107 maintains a capacity resource configuration database 111 (FIG. 1), which indicates how the system capacity resources are to be configured. The NOC 107 capacity planning function uses this information as well as knowledge of system constraints to determine the sequence of commands that need to be executed in order to realize the desired capacity resource configuration. The capacity resource configuration database 111 provides the capability to specify periodically the following parameters: demodulator assignments to uplink cells, demodulator carrier rate configuration, downlink TDM frame structure, dedicated and supervisory contention channel assignments, and number and allocation of channels. The operations, which reassign a demodulator from one cell to another, reconfigure a demodulator's carrier rates, and change the downlink TDM frame structure, restrict the timing of planned capacity configuration changes.

The NOC 107 imposes restrictions on the number of configuration changes that are allowed within certain time intervals, based on the timing constraints associated with these operations. The payload 105*a* is responsible for implementing capacity resource configuration changes as commanded by the NOC 107. However, the payload 105*a* does not configure capacity resources autonomously.

Upon determining the initial capacity distribution over the coverage region, the operator uses the specified capacity distribution (e.g., uniform) to determine the mapping of demodulators 105*b* to cells, demodulator channel configurations, and configuration of the downlink TDM frame partition, taking into consideration all related constraints. The resulting capacity plan is stored in resource configuration database 111, along with the time when the plan is to take effect. At the specified time, the NOC 107 sends commands to the payload 105*a* to implement the plan.

On a daily basis, the capacity plan is updated in order to meet capacity requirements over the coverage region. The operator plans capacity resource configuration changes and enters the changes into the resource configuration database 111. Demodulators 105*b* are re-designated (i.e., "moved") from one cell to another to meet requirements for additional capacity. As the user base changes during the course of the day, for example, from enterprise users to home-based Web surfing, demodulator carrier configurations are adjusted to meet the demands for less high rate, more connectionless service.

The initial capacity planning thread 205 determines how to configure capacity resources on the payload 105*a* and may include the following processes: service class planning, frequency planning, demodulator planning, and downlink TDM frame partition planning. In the service class planning process, the operator determines the amount of capacity that is to be provided in each uplink cell per service class, based on several factors; these factors include NSP allocations of services, traffic trend analysis, expected demand for services in each cell, and the availability of capacity. The service class allocations specify how many channels are to be configured at each service rate and how this capacity is to be allocated to connection-oriented and connectionless services, contention channels, and fenced-off channels. Downlink broadcast capacity is also specified.

Based on the information provided in the service class planning process, the operator determines the number of demodulators 105*b* that are required in each cell. Using this information, a frequency plan is generated that specifies subband-to-cell allocations. The frequency plan is created taking into consideration all frequency constraints of the system and any operator-specified constraints. An operator constraint can, for example, specify that a certain frequency subband is either restricted from or may be assigned to a certain cell. Such constraints may be specified based on interference scenarios or due to system constraints. A tool is provided by the NOC 107 to generate the frequency plan based on the number of demodulators 105*b* that are required in each cell. It should be noted that the operator may override the frequency plan with a valid alternative plan.

For any given capacity distribution, a number of frequency plans that meet the NSP's requirements may exist. All such plans introduce co-polarization and cross-polarization interference due to frequency reuse over the region. The operator is responsible for analysis of this interference, regeneration of a frequency plan with constraints based on interference analysis, and selection of the plan to be implemented.

The initial demodulator configuration planning involves two processes. The first process maps demodulators 105*b* to cells based on the frequency plan that has been created. As with the frequency plan, there may be several alternative mappings of demodulators 105*b* to cells, and the operator may override the mapping generated by the NOC 107. Operator-specified constraints may map specific demodulators 105*b* to cells or restrict the use of certain demodulators 105*b*. The resulting plan, for instance, maps 224 demodulators 105*b* to the 112 uplink cells. The second demodulator planning process specifies the configuration of each demodulator's channel rates or carrier layout. Carrier layout constraints are imposed due to adjacent and co-channel (co-polarization and cross-polarization) interference, and allocation of contention channels. These rates are configured based on the service class capacity parameters. In an exemplary embodiment, each demodulator 105*b* provides about 50 Mbps of capacity that may be configured to carry traffic at 16 Mbps, 2 Mbps, and 512 kbps rates. Additional demodulator configuration data, which are related to the cell in which the demodulator is assigned, are configured during system operations. The downlink TDM frame partition specifies how much of each downlink frame is used for broadcast service. The frame partition is independent of demodulator configuration plan. In addition, commanding the payload 105*a* to set the frame partition is performed independent of demodulator configuration process. The operator determines the frame partition based on the amount of broadcast capacity that have been sold to service providers, trend analysis, and expected future demand for broadcast service.

The capacity planning thread 205 identifies capacity configuration changes that may be performed during the course of a typical day to meet capacity requirements over the region as well as the constraints that may be considered when planning these changes. A capacity planning database 111 contains the plans for all scheduled capacity configuration changes, starting with the initial plan. According to one embodiment of the present invention, capacity plans may be changed hourly over the course of the day. However, changes are not required to be made every hour and may occur only a few times a day or even less frequently. The NOC 107 is responsible for initiating capacity configuration changes by sending commands to the payload 105*a* as scheduled in the capacity planning database 111. By way of example, a demodulator 105*b* is moved into the cell in the early morning hours. The demodulator carrier layout is changed several times during the day. Finally, in the evening hours, the same demodulator 105*b* is moved back to the original cell. Downlink capacity is increased over the entire region for several hours in the early morning.

The operator determines when capacity is to be moved among cells. The processes associated with the initial capacity planning thread 201 are repeated to determine a new capacity configuration. However, once the new configuration is determined, the operator also plans the transition from the old plan to the new plan. The transition plan accounts for the following constraints: the current and new capacity plans, microwave switch matrix constraints, and capacity requirements in cells that are not affected by the changes, and timing associated with moving capacity. The current and new capacity plans identify from which cells capacity is being taken and to which cells capacity is being added. The plans also identify specifically which demodulators 105b are to be moved among the cells. Due to switch matrix constraints, the plan may involve swapping demodulators 105b among cells that have no net change in capacity. Any time a demodulator 105b is moved from one cell to another, the capacity of the demodulator 105b is unavailable for a short period of time, potentially causing service interruptions in cells that are not gaining or losing capacity.

In view of this unavailability albeit temporarily, the operator may decide to use the new plan as is, and allow the demodulators 105b to be switched at the same time. Alternatively, the operator may create a transition plan that involves two or more microwave switch matrix (MSM) commands to achieve the desired configuration, but does so without interruption of traffic.

If the affected cells that are to receive no net change of capacity have two or more demodulators 105b of capacity and are lightly loaded, then the first option of using the plan, as is, may be acceptable. For example, at 2:00 a.m. traffic demands may allow demodulators 105b to be moved without affecting ongoing traffic. If capacity requirements do not allow for service interruption, then the operator develops a transition plan or attempts to find an alternative plan that accomplishes the same goal.

The transition plan involves switching the MSM 105c two or more times to get from the current plan configuration to the new plan configuration. The first step of the transition plan would move a demodulator into a cell even though the cell does not need the capacity of the additional demodulator. The second step of the transition plan would move a demodulator out of the same cell, which now has more capacity than it needs to meet its service objectives. One objective of the plan is to free up (from MSM constraints) demodulators 105b, which can be switched into the cells where additional capacity is needed. Increasing the number of demodulators 105b that are moved in a single step may result in additional timing constraints due to processing limitations of the processor 105e.

The operator specifies the channels that are to be reconfigured and the time that the change is to take effect. The NOC 107 commands the payload 105a to implement the changes. Planned demodulator carrier configurations may be scheduled by the operator to occur hourly. Planned carrier configurations might be done for several reasons, including: service class requirements, external interference scenarios, preconfigured allocations for fallback, and uplink power control rotation of contention channels. Carrier layout changes are made primarily due to service class requirements.

The NOC 107 assists the operator in determining carrier layout configurations that satisfy the following transmission constraints: adjacent channel interference, co-channel interference constraints, and various system constraints. Adjacent channel interference constraints deal with configuration of mixed mode channels within a demodulator 105b. For example, placing 2 Mbps channels next to 16 Mbps channels. Co-channel interference constraints relate to configuration of channels on demodulators 105b that share the same subband, but are assigned to different cells; examples include making contention channels co-channel with other contention channels, and 16 Mbps co-channel with other 16 Mbps channels.

The time that is needed to implement a carrier configuration change and the effects on ongoing traffic in a cell also need to be considered when planning the changes. If four 512 kbps channels are changed to a single 2 Mbps channel, the payload 105a ceases allocating traffic on the 512 kbps channels and waits for the previous bandwidth allocations to clear on these channels. After the traffic has cleared, the payload 105a may execute the configuration change. The payload 105a can begin making bandwidth allocations immediately after previous allocation have cleared, if the demodulator configuration can be guaranteed to take place before the allocated bandwidth is received at the demodulators 105b.

The operator plans changes to the downlink TDM frame partition based on service allocation requirements. Changing the frame partition may likely not have any effect on traffic, assuming that the traffic loading on the system does not cause congestion when the partition is changed. The operator specifies the time when the change is to take effect. Accordingly, the NOC 107 sends the command to the payload 105a to implement the change prior to the effective change time. STs 101 and 103 are informed of pending changes to the downlink partition via a transmission information message, which is sent periodically by the payload 105a. At the specified time, the payload 105a and all of the STs 101 and 103 of implement the change.

The payload configuration thread 207 involves the command sequences that are required to move a demodulator 105b from one cell to another and change the downlink TDM frame partition. Prior to moving the demodulator 105b, it is assumed that the NOC 107 has created frequency/capacity plans for reconfiguring capacity resources. According to one embodiment of the present invention, prior to moving the demodulator from one cell to another cell, the NOC 107 determines that the demodulator 105b is used in the first cell for best effort traffic only and that this traffic can be moved to the remaining demodulator 105b by the payload 105a. For example, the NOC 107, according to the capacity planning thread 205, has determined that a subband I demodulator is going to be moved from cell 1 to cell 2 at 12:00 a.m.; and at 1:00 a.m., the downlink TDM frame partition is to be changed to increase the amount of service coverage. When the demodulator 105b is moved, the corresponding carrier layout is also modified, as specified in the NOC 107 capacity resource configuration database 111.

Figure 5:
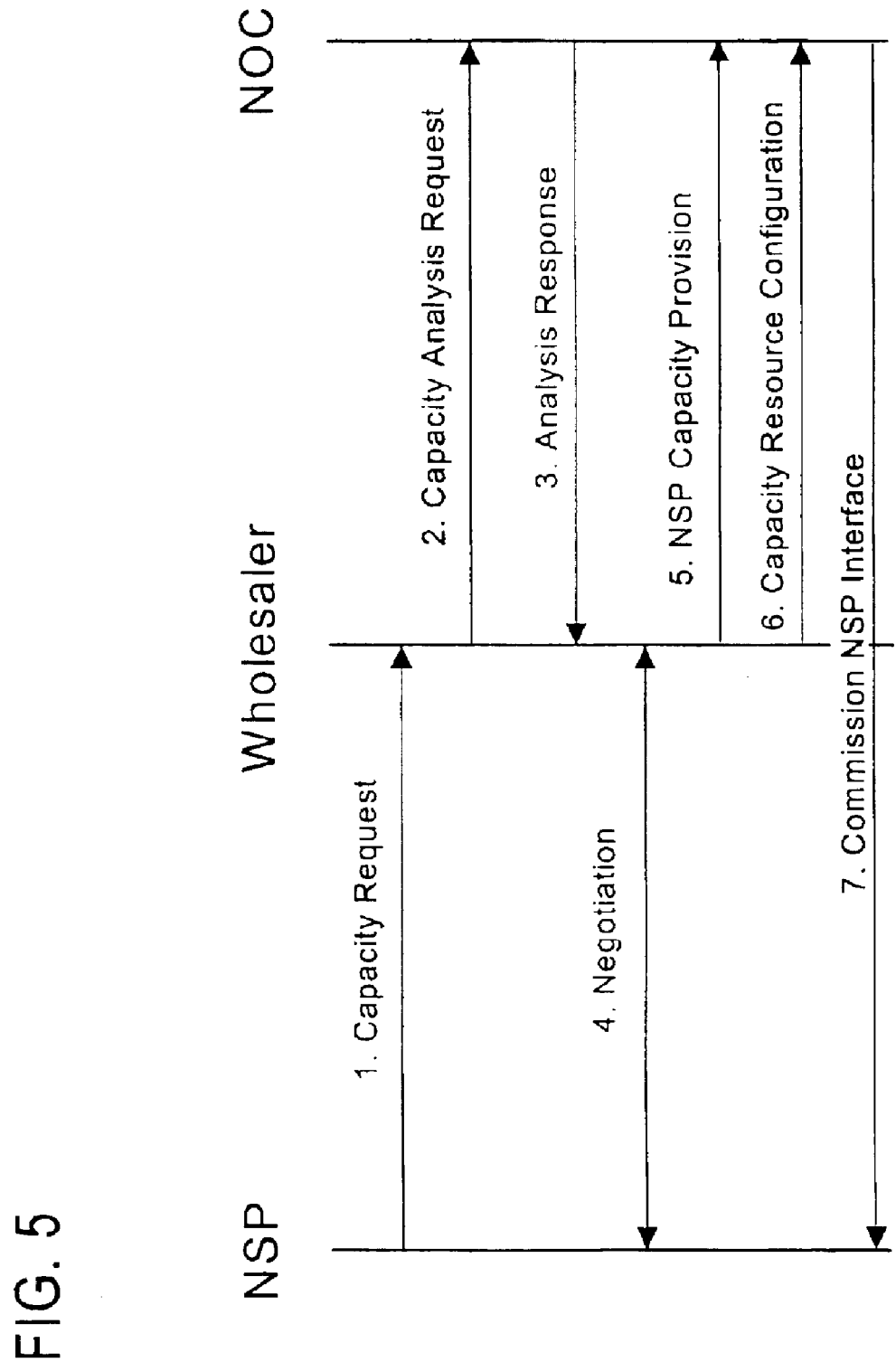
FIG. 5 is a diagram of a sequence diagram of the NSP (Network Service Providers) capacity provisioning thread of FIG. 2.

FIG. 5 shows the process flow of the NSP capacity provisioning thread of FIG. 2. In step 1, an NSP makes a request for service. For the purposes of explanation, it is assumed that NSP requests service within a single cell Next, the wholesaler requests information, as in Step 2, from the NOC 107 to determine if the request can be met. In turn, the NOC 107 responds to the capacity analysis request, acknowledging that the request can be met if system capacity resources are reconfigured (Step 3). The results of the analysis that is performed by the NOC 107 could be any one of the following scenarios: (1) the requested services can be provided based on current system configuration of capacity resources; (2) the requested services can be provided, but would require reconfiguration of system capacity resources; (3) the requested services can be partially met based on current system configuration of capacity resources; (4) the requested services can be partially met but would require reconfiguration of system capacity resources; and (5) the requested services cannot be provided.

Step 4 is the NSP and Wholesaler negotiation and contract agreement process, which results in the determination of NSP capacity provision parameters. As shown in the figure, this negotiation process is separate from the relationship between the NOC 107 and wholesaler as well as the information the wholesaler provides for NOC 107 databases. In Step 5, based on the negotiation and contract agreement between the Wholesaler and NSP, the wholesaler provides information to the NOC 107 related to the determined capacity provision parameters for the NSP. These provision parameters are used by the NOC 107 to limit services available to NSPs. In Step 6, the Wholesaler instructs (i.e., authorizes) the NOC 107 to reconfigure capacity resources. The wholesaler specification of NSP capacity provisions is maintained separate from the wholesaler specification of capacity resource configurations. This separation allows the wholesaler to specify how system capacity resources are to be configured over the region and over time. Based on the system capacity resource allocations, the wholesaler can overbook capacity allocated to NSPs. For example, the Wholesaler may elect to leave capacity resources configured as they are and overbook NSP allocations.

In Step 7, the NOC 107 supplies a user interface to the NSP for the purpose of provisioning services to STs. As stated above, the capacity provision parameters that are specified for the NSP are used by the NOC 107 to limit the provisioning of services to STs by the NSP. Therefore, for each NSP, the wholesaler provides detailed information about how much capacity the NSP's STs 101 and 103 are allowed to use and the services each NSP is allowed to provide to the STs 101 and 103 on a cell-by-cell basis over time. This information is also used by the NOC 107 during system operations to limit capacity usage at the NSP level. For example, if the NSP is allowed to use up to 4 Mbps of on-demand connection services at 512 kbps rates, the NOC 107 connection admission control function will check that a ST's request for an on-demand connection does not exceed the NSP's limit.

Figure 6:
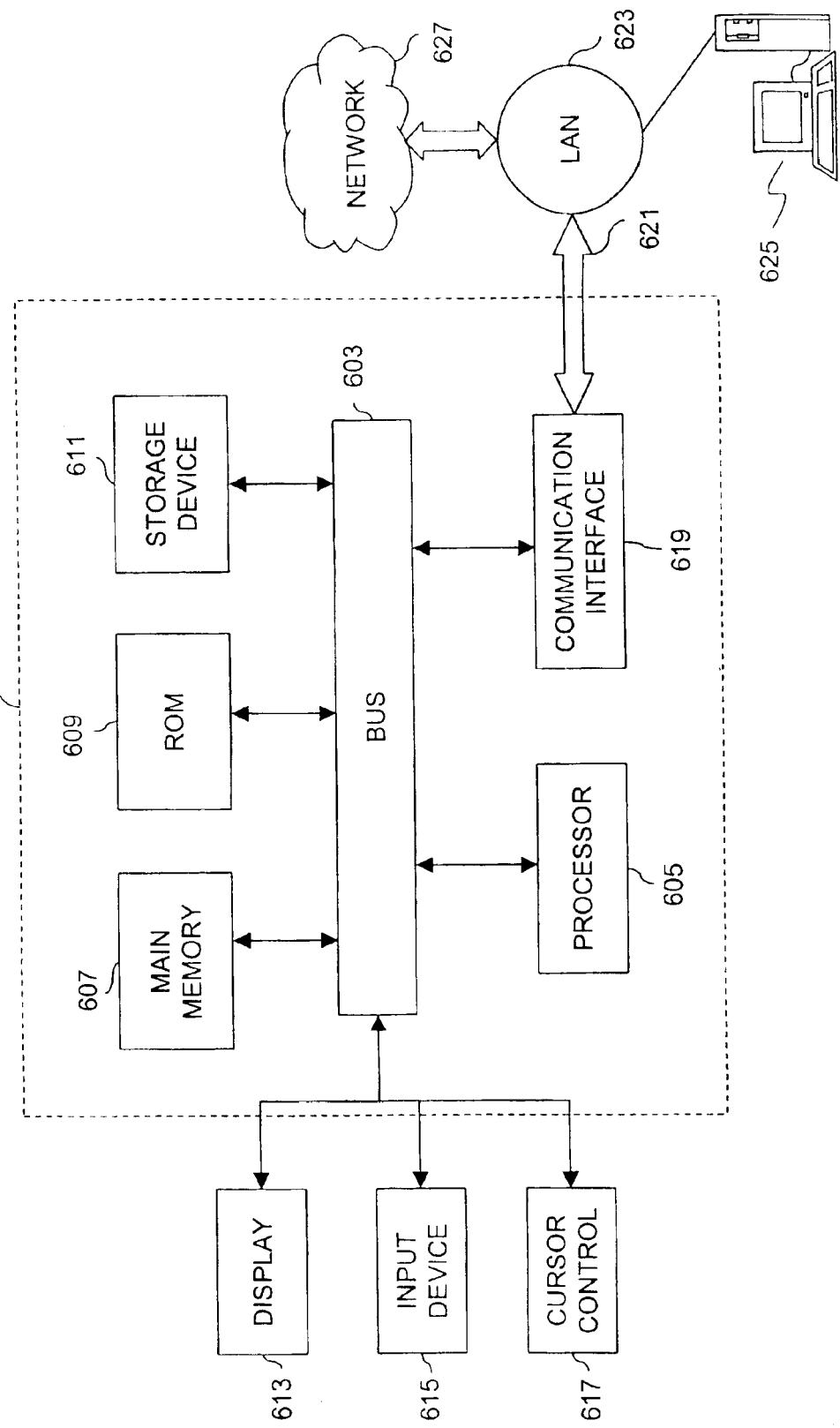
FIG. 6 is a diagram of a computer system that can perform capacity management functions associated with the NOC (Network Operations Center), in accordance with an embodiment of the present invention.

FIG. 6 illustrates a computer system 601 upon which an embodiment according to the present invention may be implemented to manage the system capacity of system 100. Computer system 601 includes a bus 603 or other communication mechanism for communicating information, and a processor 605 coupled with bus 603 for processing the information. Computer system 601 also includes a main memory 607, such as a random access memory (RAM) or other dynamic storage device, coupled to bus 603 for storing information and instructions to be executed by processor 605. In addition, main memory 607 may be used for storing temporary variables or other intermediate information during execution of instructions to be executed by processor 605. Computer system 601 further includes a read only memory (ROM) 609 or other static storage device coupled to bus 603 for storing static information and instructions for processor 605. A storage device 611, such as a magnetic disk or optical disk, is provided and coupled to bus 603 for storing information and instructions.

Computer system 601 maybe coupled via bus 603 to a display 613, such as a cathode ray tube (CRT), for displaying information to a computer user. An input device 615, including alphanumeric and other keys, is coupled to bus 603 for communicating information and command selections to processor 605. Another type of user input device is cursor control 617, such as a mouse, a trackball, or cursor direction keys for communicating direction information and command selections to processor 605 and for controlling cursor movement on display 613.

According to one embodiment, retrieval of system capacity resource configuration data is provided by computer system 601 in response to processor 605 executing one or more sequences of one or more instructions contained in main memory 607. Such instructions may be read into main memory 607 from another computer-readable medium, such as storage device 611. Execution of the sequences of instructions contained in main memory 607 causes processor 605 to perform the process steps described herein. One or more processors in a multi-processing arrangement may also be employed to execute the sequences of instructions contained in main memory 607. In alternative embodiments, hard-wired circuitry may be used in place of or in combination with software instructions. Thus, embodiments are not limited to any specific combination of hardware circuitry and software.

Further, the capacity management thread 200 of the present invention may reside on a computer-readable medium. The term "computer-readable medium" as used herein refers to any medium that participates in providing instructions to processor 605 for execution. Such a medium may take many forms, including but not limited to, non-volatile media, volatile media, and transmission media. Non-volatile media includes, for example, optical or magnetic disks, such as storage device 611. Volatile media includes dynamic memory, such as main memory 607. Transmission media includes coaxial cables, copper wire and fiber optics, including the wires that comprise bus 603. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 605 for execution. For example, the instructions may initially be carried on a magnetic disk of a remote computer. The remote computer can load the instructions relating to capacity management remotely into its dynamic memory and send the instructions over a telephone line using a modem. A modem local to computer system 601 can receive the data on the telephone line and use an infrared transmitter to convert the data to an infrared signal. An infrared detector coupled to bus 603 can receive the data carried in the infrared signal and place the data on bus 603. Bus 603 carries the data to main memory 607, from which processor 605 retrieves and executes the instructions. The instructions received by main memory 607 may optionally be stored on storage device 611 either before or after execution by processor 605.

Computer system 601 also includes a communication interface 619 coupled to bus 603. Communication interface 619 provides a two-way data communication coupling to a network link 621 that is connected to a local network 623. For example, communication interface 619 may be a network interface card to attach to any packet switched local area network (LAN). As another example, communication interface 619 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 619 sends and receives electrical, electromagnetic or optical signals that carry digital data streams representing various types of information.

Network link 621 typically provides data communication through one or more networks to other data devices. For example, network link 621 may provide a connection through local network 623 to a host computer 625 or to data equipment operated by a service provider, which provides data communication services through a communication network 627 (e.g., the Internet). LAN 623 and network 627 both use electrical, electromagnetic or optical signals that carry digital data streams. The signals through the various networks and the signals on network link 621 and through communication interface 619, which carry the digital data to and from computer system 601, are exemplary forms of carrier waves transporting the information. Computer system 601 can transmit notifications and receive data, including program code, through the network(s), network link 621 and communication interface 619.

The techniques described herein provide several advantages over prior approaches to managing system capacity. A satellite communications system provides communication services to a region. A terminal, which is located within the region, transmits and receives signals over a satellite, which has a payload that processes the signals. The terminal has a predetermined profile that includes service class information and rate information. A hub receives system capacity resource configuration data that reflect capacity requirements of a service provider and determines partitioning of system capacity over the region based upon the system capacity resource configuration data. The hub transmits configuration information to the payload of the satellite, according to the determined partitions. The terminal transmits a bandwidth request message to the payload, which in turn, selectively allocates bandwidth in response to the request message based upon the configuration information. Under this approach, the system capacity of the satellite communications system is efficiently managed.

Obviously, numerous modifications and variations of the present invention are possible in light of the above teachings. It is therefore to be understood that within the scope of the appended claims, the invention maybe practiced otherwise than as specifically described herein.

What is claimed is:

1. A method of managing system capacity of a communication system, the method comprising:
   receiving system capacity resource configuration data that reflect capacity requirements of a service provider;
   receiving a predetermined profile of a terminal that is served by the communication system, the predetermined profile including service class information and rate information;
   partitioning the system capacity based upon capacity requirements of a plurality of network service providers, a portion of the system capacity being designated as a shared capacity pool among the network service providers and another portion of the system capacity being dedicated to one of the network service providers;
   generating a capacity plan based upon the partitioned system capacity, capacity resource configuration data and the predetermined profile; and
   configuring a remote processor according to the capacity plan, the remote processor being configured to process bandwidth request messages from the terminal and to selectively allocate bandwidth to the terminal in response to the bandwidth request messages.

2. The method according to claim 1, further comprising:
   controlling admission of the terminal into the communication system based, in part, on the predetermined profile.

3. The method according to claim 1, further comprising:
   inputting the predetermined profile of the terminal by the service provider, the predetermined profile being based on a service level agreement.

4. The method according to claim 3, wherein the system capacity resource configuration data in the step of receiving the system capacity resource configuration data is provided by the service provider through an operator interface.

5. The method according to claim 4, wherein the predetermined profile in the step of receiving the system capacity resource configuration data specifies whether to permit the terminal to burst over a committed information rate (CIR).

6. The method according to claim 4, wherein the step of receiving the system capacity resource configuration data is performed on an hourly basis.

7. The method according to claim 1, wherein the system capacity includes uplink capacity and downlink capacity of a satellite.

8. The method according to claim 7, wherein the uplink capacity is categorized according to that service classes include a scheduled class, an on-demand class, a high priority connectionless class, and a low priority connectionless class, the downlink capacity being categorized according to transmission services that include a broadcast service, a multicast service, and a point-to-point service.

9. The method according to claim 8, wherein the system capacity resource configuration data in the step of receiving the system capacity resource configuration data include information relating to the service classes of the uplink capacity and to the transmission services of the downlink capacity.

10. The method according to claim 7, wherein the communication system includes a satellite comprising a plurality of demodulators configured to receive signals from the terminal, the configuring step comprising:
    transmitting configuration information that specifies demodulator assignment and demodulator carrier rate associated with the uplink capacity, the uplink capacity being partitioned as increments corresponding to the plurality of demodulators.

11. The method according to claim 1, further comprising:
    initially partitioning the system capacity according to at least one of a uniform distribution and a distribution based upon population density.

12. A communication hub for managing system capacity of a communication system, comprising:
    an operator interface configured to receive system capacity resource configuration data that reflect capacity requirements of a service provider, wherein the system capacity is partitioned based upon capacity requirements of a plurality of network service providers, a portion of the system capacity being designated as a shared capacity pool among the network service providers and another portion of the system capacity being dedicated to one of the network service providers;
    a service provider interface configured to receive a predetermined profile of a terminal that is served by the communication system; and a computer system communicating with the operator interface and the service provider interface, the computer system configured to generate a capacity plan based upon the partitioned system capacity, the capacity resource configuration data and the predetermined profile that includes service class information and rate information, wherein the computer system configures a remote processor according to the capacity plan, the remote processor being configured to process bandwidth request messages from the terminal and to selectively allocate bandwidth to the terminal in response to the bandwidth request messages.

13. The hub according to claim 12, wherein the predetermined profile of the terminal is based upon a service level agreement between the service provider and an operator of the communication system.

14. The hub according to claim 13, further comprising:

a database configured to store the predetermined profile and the system capacity resource configuration data corresponding to the service level agreement.

15. The hub according to claim 14, wherein the system capacity resource configuration data are specified to occur on an hourly basis.

16. The hub according to claim 14, wherein the predetermined profile specifies whether to permit the terminal to burst over a committed information rate (CIR).

17. The hub according to claim 12, wherein the system capacity includes uplink capacity and downlink capacity of the satellite, the computer system managing the uplink capacity and the downlink capacity by controlling admission of the terminal.

18. The hub according to claim 17, wherein the uplink capacity is categorized according to service classes that include a scheduled class, an on-demand class, a high priority connectionless class, and a low priority connectionless class, the downlink capacity being categorized according to transmission services that include a broadcast service, a multicast service, and a point-to-point service.

19. The hub according to claim 18, further comprising:

a database configured to store system capacity resource configuration data that include information relating to the service classes of the uplink capacity and to the transmission services of the downlink capacity.

20. The hub according to claim 17, wherein the satellite comprises a plurality of demodulators configured to receive signals from the terminal, the configuration information specifying demodulator assignment and demodulator carrier rate associated with the uplink capacity, the uplink capacity being partitioned as increments corresponding to the plurality of demodulators.

21. The hub according to claim 12, wherein the system capacity is initially partitioned according to at least one of a uniform distribution and a distribution based upon population density.

22. A satellite communications system for providing communication services to a region, comprising:

a terminal located within the region and configured to transmit and receive signals over a satellite having a payload that processes the signals, the terminal having a predetermined profile that includes service class information and rate information; and a hub configured to receive system capacity resource configuration data that reflect capacity requirements of a service provider and to determine partitioning of system capacity over the region based upon the system capacity resource configuration data, wherein the system capacity is partitioned based upon capacity requirements of a plurality of network service providers, a portion of the system capacity being designated as a shared capacity pool among the network service providers and another portion of the system capacity being dedicated to one of the network service providers, the hub transmitting configuration information to the payload of the satellite according to the determined partitions, wherein the terminal is configured to transmit a bandwidth request message to the payload, the payload selectively allocating bandwidth in response to the request message based upon the configuration information.

23. The system according to claim 22, wherein the predetermined profile of the terminal is specified by a network service provider according to a service level agreement.

24. The system according to claim 22, further comprising:

a database resident within the hub and configured to store the predetermined profile, and the system capacity resource configuration data.

25. The system according to claim 22, wherein the system capacity resource configuration data are specified to occur on an hourly basis.

26. The system according to claim 22, wherein the predetermined profile specifies whether to permit the terminal to burst over a committed information rate (CIR).

27. The system according to claim 22, wherein the system capacity includes uplink capacity and downlink capacity of the satellite, the hub being configured to manage the uplink capacity and the downlink capacity by controlling admission of the terminal.

28. The system according to claim 27, wherein the uplink capacity is categorized according to service classes that include a scheduled class, an on-demand class, a high priority connectionless class, and a low priority connectionless class, the downlink capacity being categorized according to transmission services that include a broadcast service, a multicast service, and a point-to-point service.

29. The system according to claim 28, further comprising:

a database resident within the hub and configured to store the system capacity resource configuration data that include information relating to the service classes of the uplink capacity and to the transmission services of the downlink capacity.

30. The system according to claim 27, wherein the satellite comprises a plurality of demodulators configured to receive the signals from the terminal, the configuration information specifying demodulator assignment and demodulator carrier rate associated with the uplink capacity, the uplink capacity being partitioned as increments corresponding to the plurality of demodulators.

31. The system according to claim 22, wherein the system capacity is initially partitioned according to at least one of a uniform distribution and a distribution based upon population density.

32. The system according to claim 22, wherein the hub comprises a provisioning interface that permits a network service provider to supply the predetermined profile to the hub.

33. A satellite communications system for providing communication services, the system comprising:

means for receiving system capacity resource configuration data that reflect capacity requirements of a service provider, wherein the system capacity is partitioned based upon capacity requirements of a plurality of network service providers, a portion of the system capacity being designated as a shared capacity pool among the network service providers and another portion of the system capacity being dedicated to one of the network service providers;

means for receiving a predetermined profile of a terminal that is served by the communication system, the predetermined profile including service class information and rate information;

means for generating a capacity plan based upon the capacity resource configuration data and the predetermined profile; and means for configuring a remote processor according to the capacity plan, the remote processor being configured to process bandwidth request messages from the terminal and to selectively allocate bandwidth to the terminal in response to the bandwidth request messages.

34. The system according to claim 33, further comprising:
means for controlling admission of the terminal into the communication system based, in part, on the predetermined profile.

35. The system according to claim 33, further comprising:
means for inputting the predetermined profile of the terminal by the service provider, the predetermined profile being based on a service level agreement.

36. The system according to claim 33, wherein the predetermined profile specifies whether to permit the terminal to burst over a committed information rate (CIR).

37. The system according to claim 33, wherein the system capacity resource configuration data is specified to occur on an hourly basis.

38. The system according to claim 33, wherein the system capacity includes uplink capacity and downlink capacity of a satellite.

39. The system according to claim 38, wherein the uplink capacity is categorized according to service classes that include a scheduled class, an on-demand class, a high priority connectionless class, and a low priority connectionless class, the downlink capacity being categorized according to transmission services that include a broadcast service, a multicast service, and a point-to-point service.

40. The system according to claim 39, wherein the system capacity resource configuration data include information relating to the service classes of the uplink capacity and to the transmission services of the downlink capacity.

41. The system according to claim 38, wherein the communication system includes a satellite comprising a plurality of demodulators configured to receive signals from the terminal, the system further comprises:
means for transmitting configuration information that specifies demodulator assignment and demodulator carrier rate associated with the uplink capacity, the uplink capacity being partitioned as increments corresponding to the plurality of demodulators.

42. The system according to claim 33, wherein the system capacity is initially partitioned according to at least one of a uniform distribution and a distribution based upon population density.

43. A computer-readable medium carrying one or more sequences of one or more instructions for managing system capacity of a communication system, the one or more sequences of one or more instructions including instructions which, when executed by one or more processors, cause the one or more processors to perform the steps of:
receiving system capacity resource configuration data that reflect capacity requirements of a service provider;
receiving a predetermined profile of a terminal that is served by the communication system, the predetermined profile including service class information and rate information;
partitioning the system capacity based upon capacity requirements of a plurality of network service providers, a portion of the system capacity being designated as a shared capacity pool among the network service providers and another portion of the system capacity being dedicated to one of the network service providers;
generating a capacity plan based upon the partitioned system capacity, the capacity resource configuration data and the predetermined profile; and
configuring a remote processor according to the capacity plan, the remote processor being configured to process bandwidth request messages from the terminal and to selectively allocate bandwidth to the terminal in response to the bandwidth request messages.

44. The computer readable medium according to claim 43, further comprising computer-executable instructions for causing the one or more processors to perform the step of:
controlling admission of the terminal into the communication system based, in part, on the predetermined profile.

45. The computer readable medium according to claim 43, further comprising computer-executable instructions for causing the one or more processors to perform the step of:
inputting the predetermined profile of the terminal by the service provider, the predetermined profile being based on a service level agreement.

46. The computer readable medium according to claim 45, wherein the system capacity resource configuration data in the step of receiving the system capacity resource configuration data is provided by the service provider through an operator interface.

47. The computer readable medium according to claim 46, wherein the predetermined profile in the step of receiving the system capacity resource configuration data specifies whether to permit the terminal to burst over a committed information rate (CIR).

48. The computer readable medium according to claim 46, wherein the selectively receiving step is performed on an hourly basis.

49. The computer readable medium according to claim 43, wherein the system capacity includes uplink capacity and downlink capacity of a satellite.

50. The computer readable medium according to claim 49, wherein the uplink capacity is categorized according to service classes that include a scheduled class, an on-demand class, a high priority connectionless class, and a low priority connectionless class, the downlink capacity being categorized according to transmission services that include a broadcast service, a multicast service, and a point-to-point service.

51. The computer readable medium according to claim 50, wherein the system capacity resource configuration data in the step of receiving the system capacity resource configuration data include information relating to the service classes of the uplink capacity and to the transmission services of the downlink capacity.

52. The computer readable medium according to claim 49, wherein the communication system includes a satellite comprising a plurality of demodulators configured to receive signals from the terminal, the configuring step comprising:
transmitting configuration information that specifies demodulator assignment and demodulator carrier rate associated with the uplink capacity, the uplink capacity being partitioned as increments corresponding to the plurality of demodulators.

53. The computer readable medium according to claim 43, further comprising computer-executable instructions for causing the one or more processors to perform the step of: initially partitioning the system capacity according to at least one of a uniform distribution and a distribution based upon population density.

* * * * *